United States Patent [19]

Macko

[11] 4,275,601
[45] Jun. 30, 1981

[54] SOLIDS MASS FLOW DETERMINATION

[75] Inventor: Joseph E. Macko, Hempfield Township, Westmoreland County, Pa.

[73] Assignee: Westinghouse Electric Corp., Pittsburgh, Pa.

[21] Appl. No.: 102,500

[22] Filed: Dec. 11, 1979

[51] Int. Cl.³ .......................... G01F 1/68; G01F 1/74
[52] U.S. Cl. .................................. 73/861.04; 73/204
[58] Field of Search ........................... 73/861.04, 204; 364/510

[56] References Cited

U.S. PATENT DOCUMENTS

| | | | |
|---|---|---|---|
| 1,446,461 | 2/1923 | Hinman | 73/204 |
| 2,729,976 | 1/1956 | Laub | 73/204 |
| 3,446,073 | 5/1969 | Auphan et al. | 73/204 X |
| 3,604,263 | 9/1971 | Auphan et al. | 73/204 |
| 4,016,759 | 4/1977 | Baker et al. | 73/204 |
| 4,083,243 | 4/1978 | Cochran, Jr. | 73/204 X |

Primary Examiner—Charles A. Ruehl
Attorney, Agent, or Firm—Edward L. Levine

[57] ABSTRACT

Method and apparatus for determining the mass flow rate of solids mixed with a transport fluid to form a flowing mixture. A temperature differential is established between the solids and fluid. The temperature of the transport fluid prior to mixing, the temperature of the solids prior to mixing, and the equilibrium temperature of the mixture are monitored and correlated in a heat balance with the heat capacities of the solids and fluid to determine the solids mass flow rate.

4 Claims, 1 Drawing Figure

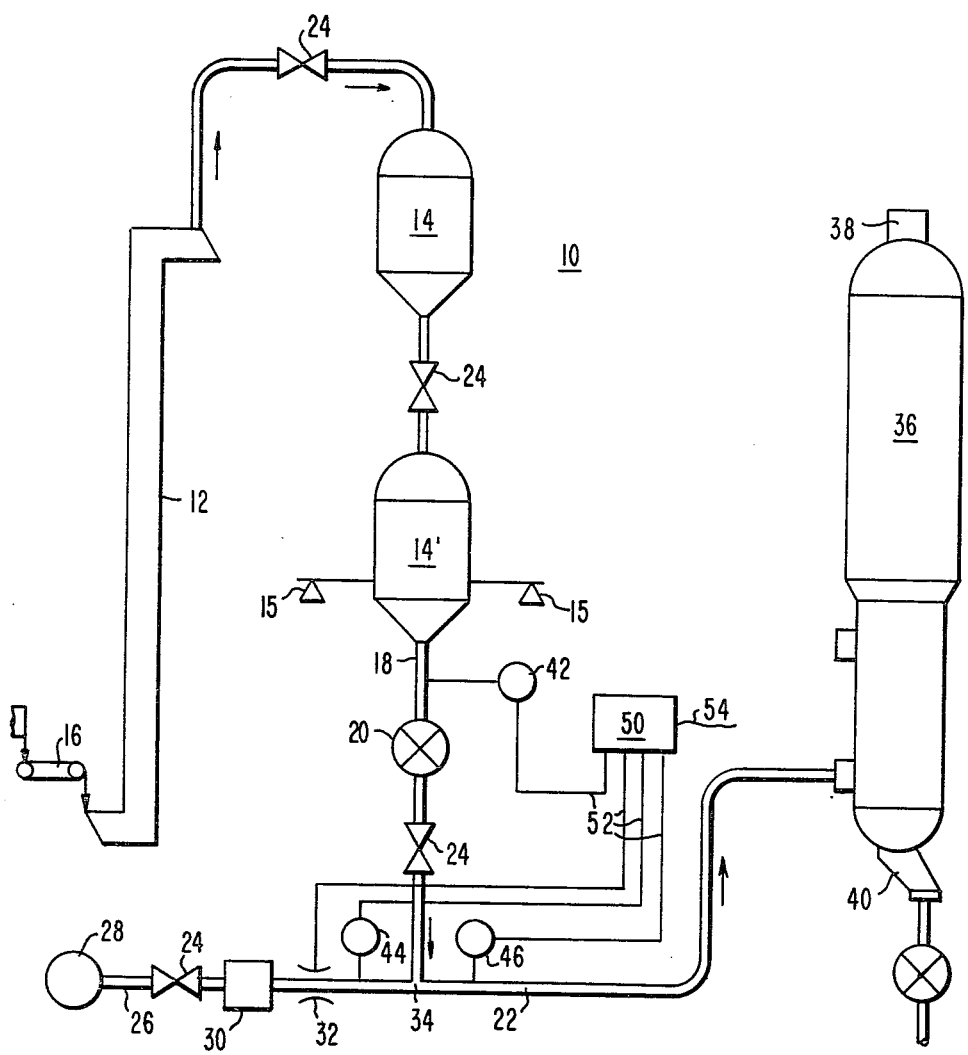

SOLIDS MASS FLOW DETERMINATION

GOVERNMENT CONTRACT

The invention described herein was made or conceived in the course of, or under, a contract with the United States Department of Energy.

BACKGROUND OF THE INVENTION

1. Field of the Invention

This invention relates to a system for determining the mass flow of solids in a flowing fluid-solid mixture, and particularly provides a system for measuring particulate coal or coal derivative mass flow in a flowing transport gas.

2. Description of the Prior Art

In many systems transporting solids or particulate matter in a flowing fluid, it is important to continuously, or intermittently, monitor mass flow in order to properly maintain the process control. This is particularly required in the process streams of coal gasification, liquefaction and fluidized bed combustion systems. Such systems typically feed coal, or coal derivatives such as char, in particulate form, from lock hoppers through starwheel feeders and, in a transport gas, to the process reactor.

While the mass flow rate of the transport gas, prior to mixing with the particulate matter, can be accurately identified with devices such as an orifice, identification of the particulate matter mass flow rate prior to, and subsequent to, mixing with the transport gas, cannot be easily measured with sufficient accuracy. A primary reason for this limitation is that in-line devices, at the operational flow rates, are subjected to a sandblasting type effect which substantially shortens operational life. Additionally, the particulate matter tends to travel at a different flow rate than the transport gas.

Techniques presently used to determine particulate mass flow, upstream of the area of mixing with the transport gas, include lock hopper weight measurement, starwheel feeder speed measurement, and a technique utilizing filtering of lock hopper weight measurement data. Each of these techniques, however, present some undesirable characteristics. Lock hopper weight measurements typically utilize a plurality of strain-gauge type load cells which are summed and monitored. These systems are complicated by mechanical restraints imposed by rigid process system piping and stresses placed upon the hopper by pressurization and thermal expansion, imposing extraneous stresses on the gauges. The strain gauge indications also tend to fluctuate during operation, and systems are utilized to filter or average the indications so as to dampen the fluctuations. Such systems, however, are deficient as a result of an inherent time lag between the raw data and filtered data, inappropriate indications when transfers are made among a plurality of lock hoppers, and the effects associated with lock hoppers generally. Designs can be provided which guarantee a free floating lock hopper and load cell system, and which provide accurate indications, but only with substantial complexity.

With utilization of a starwheel feeder, although the volume of the feeder pockets is known, the pockets are not uniformly filled. Particle size, moisture content and other variables effect the mass transfer rate for a given revolution rate. Additionally, fine material tends to be retained for a perod of time within the feeder pockets and the surrounding casing as a result of pressure differentials, thus providing inaccurate mass flow indications.

Additionally, the existing techniques rely upon upstream measurements, and do not directly indicate any characteristic of the particulate-transport fluid mixture.

It is therefore desirable to provide a substantially on-line arrangement for determining particulate mass flow rate in a transport fluid which alleviates the discussed deficiencies. It is further desirable to provide an arrangement which is simple, reliable and which takes advantage of existing process components.

SUMMARY OF THE INVENTION

This invention provides method and apparatus for the determination of the mass flow rate of particulate matter flowing in a transport fluid which is simple in terms of components required, and reliable in operation. In a primary embodiment, where carbonaceous material, preferably coal or coal derivatives such as char, in particulate form, is fed into a flowing transport gas to be fed into a coal gasification reactor, the arrangement includes utilization of a heater and three measuring devices such as clamp-on type thermocouples.

One thermocouple indicates the temperature of the particulate matter, such as char, prior to mixing with the transport gas. The transport gas can, for example, be recycled product gas produced in the gasification process. A second thermocouple indicates the temperature of the gas prior to mixing, and a third thermocouple indicates the temperature of the char-gas mixture preferably at, or somewhat downstream of the region where the mixture has obtained thermal equilibrium. The mass flow rate of the gas, prior to mixing, is determined by a device such as a flow orifice.

A temperature differential between the particulate char and the recycled gas, prior to mixing, is established and maintained preferably in excess of 100° F. The differential is provided by a heater transferring energy to the gas. Thus, upon mixing, heat is transferred from the gas to the char until thermal equilibrium is reached.

The mass flow rate of the particulate char is then determined from a relation based upon basic heat transfer characteristics. The input parameters to the relation include the three determined termperatures, the gas mass flow rate, and the heat capacities of the transport gas and particulate matter, which are correlated in a heat balance.

BRIEF DESCRIPTION OF THE DRAWINGS

The advantages, nature and additional features of the invention will be better understood from the following description, taken in connection with the accompanying drawing, in which the sole FIGURE is a schematic of portions of a coal gasification system incorporating the invention.

DESCRIPTION OF THE PREFERRED EMBODIMENTS

Referring now to the FIGURE there is shown a portion of an exemplary coal gasification process system 10 incorporating the invention. It is to be understood that this system is merely exemplary, and that the invention is applicable to other systems where solid or particulate matter is mixed with a fluid, particularly a gas, to produce a flowing mixture.

The coal gasification system 10 includes, for example, a belt-type feeder 12 which transports a carbonaceous material, preferably coal or coal derivatives such as char or coke breeze, in solid, preferably particulate form, to a lock hopper 14. The particulate matter is preferably passed through a weighing device 16 prior to transport to the hopper 14. The particulate matter is then batch transferred to lock hopper 14'. From lock hopper 14' the particulate matter flows, continuously during normal operation, through conduit 18 and starwheel feeder 20 to conduit 22. Throughout the system valves 24 and other control means are used as appropriate.

The feed rate of material can be measured by load cells 15 as the starwheel feeder 20 feeds the particulate matter into the system. The star wheel feeder 20 can also provide a measurement of the mass of particulate matter flowing in conduit 18.

A conduit 26 carries a transport fluid from a fluid source 28. In the exemplary coal gasification system the transport fluid is a gas, for example, recycled system product gas or any other gas compatible with the gasification process such as steam, nitrogen, oxygen, carbon dioxide or air, among others. In accordance with the invention it is necessary to establish a temperature differential between the transport fluid and the particulate matter. This can readily be accomplished by utilization of a heater 30 in conduit 26, while maintaining the particulate matter at its existing temperature. The heater establishes a temperature differential of preferably at least 100° F.

The transport fluid in conduit 26 is mixed with the particulate matter at the junction 34 of conduits 18, 26 and 22. The mixture then flows to a process reactor, such as a fluidized bed gasifier-agglomerator 36 from which is discharged a combustible product gas through an outlet 38 and product solids such as ash through an outlet 40.

Although the particulate matter and transport fluid are mixed at the junction 34, the two mediums flow at different rates through conduit 22. Additionally, upon mixing, heat energy in the hotter transport fluid is transferred to the cooler particulate matter, although a thermal equilibrium will not be achieved until some point downstream of the junction 34.

Three temperature indicating devices, preferably clamp-on type K chromel-alumel thermocouples 42, 44 and 46, are positioned to indicate the temperature of the various mediums. While such thermocouples are preferred, other devices can be used, such as resistance temperature detectors or other sensing devices installed generally flush with the conduit walls. Thermocouple 42 indicates the temperature of the particulate matter flowing in conduit 18. In the exemplary system the particulate matter is char particles approximately 0+ to ¼ inches in diameter, at ambient temperature. As noted below, the char is generally dry and free of volatile materials. Thermocouple 44 indicates the temperature of the transport gas which, in the exemplary system, is recycled product gas, downstream of the heater 30 and the mass flow indicating orifice 32. The product gas is discharged from the gasifier agglomerator at approximately 1900° F. and 250 psig, but after cleaning and cooling enters conduit 26 at approximately 150° F. and 300 psig, and is heated in heater 30 to approximately 600° F. at 250 psig. The mixture reaches an equilibrium temperature in conduit 22 which is dependent on the mass flow rates of the particles and gas, the actual temperature being indicated by thermocouple 46. It is important that thermocouple 46 be located in the region of conduit 22 where thermal equilibrium has been attained.

This location can be determined for any given system through calibration type measurements made during startup and testing of the system. For example, temperature measurements can be taken along conduit 22 to indicate where a peak or leveling of temperature indications occurs. It is also desirable, where a system will operate at other than generally constant conditions, to establish the thermal equilibrium point as a function of, for example, gas flow rate, since the equilibrium point will vary with variations in the gas flow. In the exemplary system where the gas mass flow rate is 300 lb/hr and conduit 22 is one inch in diameter, the equilibrium point was found to be approximately eighty-three inches downstream of junction 34. In a large plant, initial testing could be performed at, for example, the minimum and maximum gas flow rates, and the points at which leveling occurs noted. A thermocouple would be positioned at the most downstream point.

It will now be apparent that, with the apparatus described, the following parameters can continuously be monitored during system operation:

$M_f$—the mass flow rate of the transport fluid as indicated by orifice 32;

$T_f$—the temperature of the transport fluid, as indicated by thermocouple 44;

$T_p$—the temperature of the solid particulate matter, as indicated by thermocouple 42; and $T_m$—the temperature of the mixture, as indicated by thermocouple 46.

Additionally, for any given transport fluid and particulate matter type, the heat capacity ($C_p$) can be determined and, as used herein, $C_{pf}$ refers to the heat capacity of the transport fluid and $C_{pp}$ refers to the heat capacity of the particulate matter. It will be understood that where the transport fluid is comprised of several types of gases, the heat capacity for the fluid will be a function of the individual heat capacities of each of the constituent mediums, and can be determined from gas analyzer instrumentation.

From basic heat transfer relations it is known that the transfer of heat energy from the hotter recycle gas to the cooler char particles, $\Delta Q_{f-p}$, is $$\Delta Q_{f-p} = M_f C_{pf}(T_f - T_m) = M_p C_{pp}(T_m - T_p). \tag{1}$$

And accordingly, the mass flow rate of the particulate matter in the flowing mixture, $M_p$, is $$M_p = \frac{M_f C_{pf}(T_f - T_m)}{C_{pp}(T_m - T_p)}. \tag{2}$$

Relation (2) can thus be utilized for determining the particulate mass flow. The temperature and fluid flow parameters can be correlated in accordance with relation (2) in a variety of well-known manners, including an on-line, continuous or intermittent monitor and controller 50 which receives, conditions and applies appropriate data and signals from the thermocouples and the orifice transmitted through leads 52. Other data and signals, such as those indicative of the heat capacities, is also provided through leads 54.

The following parameters, exemplifying use of the relation, are representative of typical operational conditions where the particulate matter is coke breeze and the transport gas is recycled product gas.

$M_f$=400 lb/hr; $C_{pf}$=0.27; $C_{pp}$=0.24, $T_p$=71° F., $T_m$=439° F.; and $T_f$=589° F.

Accordingly, $$M_p \text{ (lb/hr)} = \frac{(400)\,(0.27)\,(589 - 439)}{0.24(439 - 71)}$$

$$M_p = 183 \text{ lb/hr}.$$

It is thus seen that the disclosed system provides a means for determining particulate mass flow rate through temperature monitoring. Changes may be made in the above-described system without departing from the spirit and scope thereof. It is therefore intended that all matter contained in the foregoing description or shown in the accompanying FIGURE be interpreted as illustrative and not in a limiting sense.

What we claim is:

1. In a process wherein carbonaceous particulate matter is mixed with a flowing fluid to produce a flowing mixture, said fluid having a heat capacity and said particulate matter having a differing heat capacity, an improved method for identifying the mass flow rate of said particulate matter, comprising:
   a. establishing a temperature differential between said particulate matter and said fluid;
   b. determining the mass flow rate of said flowing fluid prior to mixing with said particulate matter;
   c. determining the temperature of said fluid prior to mixing with said particulate matter;
   d. determining the temperature of said particulate matter prior to mixing with said fluid;
   e. determining the equilibrium temperature of said flowing mixture; and then
   f. operating upon the determined flow and temperature parameters and heat capacities to determine the mass flow rate of said particulate matter.

2. The process of claim 1 wherein said step of establishing a temperature differential between said particulate matter and said fluid comprises heating said fluid to a temperature at least 100° F. higher than said particulate matter.

3. In a process wherein carbonaceous particulate matter is mixed with a flowing fluid to produce a flowing mixture, said fluid having a heat capacity and said particulate matter having a differing heat capacity, an improved method for identifying the mass flow rate of said particulate matter, comprising:
   a. establishing a temperature differential between said particulate matter and said fluid;
   b. determining the mass flow rate of said flowing fluid;
   c. determining the temperature of said fluid prior to mixing with said particulate matter;
   d. determining the temperature of said particulate matter prior to mixing with said fluid;
   e. determining the equilibrium temperature of said flowing mixture; and then
   f. correlating the determined temperatures, fluid flow rate and known heat capacities in a heat balance to determine the mass flow rate of said particulate matter.

4. In a system wherein carbonaceous particulate matter is mixed with a flowing fluid to produce a flowing solids-fluid mixture, said particulate matter having a heat capacity and said fluid having a differing heat capacity, apparatus for identifying the mass flow rate of said particulate matter, comprising:
   a. means for establishing a temperature differential between said particulate matter and said fluid;
   b. means for determining the mass flow rate of said flowing fluid;
   c. means for determining the temperature of said fluid prior to mixing with said particulate matter;
   d. means for determining the temperature of said particulate matter prior to mixing with said fluid;
   e. means for determining the equilibrium temperature of said flowing mixture; and
   f. means for correlating the determined temperatures, fluid flow rate and known heat capacities in a heat balance to determine the mass flow rate of said particulate matter.

* * * * *